United States Patent
Pfertner et al.

Patent Number: 5,899,521
Date of Patent: May 4, 1999

[54] ANTI-BUFFET SCREEN FOR A CONVERTIBLE

[75] Inventors: Kurt Pfertner, Wimsheim; Bernd Stadler, Weissach, both of Germany

[73] Assignee: Dr. Ing.h.c.F. Porsche AG, Weissach, Germany

[21] Appl. No.: 08/908,030

[22] Filed: Aug. 11, 1997

[30] Foreign Application Priority Data

Aug. 10, 1996 [DE] Germany .......................... 196 32 352

[51] Int. Cl.[6] .................................................. B62D 35/00
[52] U.S. Cl. .......................... 296/180.1; 296/85; 280/756
[58] Field of Search ................................ 296/85, 180.1, 296/86, 89, 92, 92.1, 96.21, 96.2, 78.1; 280/756

[56] References Cited

FOREIGN PATENT DOCUMENTS

| | | |
|---|---|---|
| 0233777A2 | 8/1987 | European Pat. Off. . |
| 97110994 | 11/1997 | European Pat. Off. . |
| 85 23 831 | 11/1985 | Germany . |
| 8523831 | 11/1985 | Germany . |
| 35 37 644 C1 | 4/1987 | Germany . |
| 9004971 | 8/1990 | Germany . |
| 91 11 779 | 4/1992 | Germany . |
| 9114983 | 4/1992 | Germany . |
| 9204439 | 7/1992 | Germany . |
| 9213699 | 1/1993 | Germany . |
| 4239428A1 | 3/1994 | Germany . |
| 19534584C1 | 9/1996 | Germany . |

*Primary Examiner*—Joseph D. Pape
*Assistant Examiner*—Chad D. Wells
*Attorney, Agent, or Firm*—Evenson McKeown Edwards & Lenahan, PLLC

[57] ABSTRACT

A central part of an anti-buffet screen formed by a vertical pane is held in its operating position on a roll bar by at least one lower plug connection and by upper latch connections spaced apart from one another. The central part cannot be released from the roll bar until the spring-loaded latch levers of the latch connections are pivoted free.

13 Claims, 6 Drawing Sheets

ANTI-BUFFET SCREEN FOR A CONVERTIBLE

This application claims the priority of German application 196 32 352.5 filed in Germany on Aug. 10, 1996, the disclosure of which is expressly incorporated by reference herein.

BACKGROUND AND SUMMARY OF THE INVENTION

The invention relates to an anti-buffet screen for a convertible.

Pending, commonly assigned U.S. patent application Ser. No. 08/709,676, filed Sep. 9, 1996, and based on unpublished German patent application DE 195 34 584.3, neither of which are prior art to the present application, teaches a multipartite anti-buffet screen for a convertible, said screen being fastenable to a fixed roll bar.

A central part of the anti-buffet screen, formed by an upright pane, is held in place on the roll bar by at least one plug connection and/or a latch connection.

A goal of the invention is to improve on the mounting of a central part of the anti-buffet screen in such fashion that the central part can be inserted from a seated position in simple fashion, while preventing inadvertent release of the central part from the roll bar, especially when driving.

According to the invention, this goal is achieved by providing an arrangement wherein the anti-buffet screen is composed of a central part and two side parts, with the side parts being inserted into openings of the upwardly projecting bar sections and the central part being inserted into a central section of the roll bar that is delimited by the upwardly projecting bar sections and a tubular section running transversely, wherein the central part of the anti-buffet screen is formed by a transparent vertical pane and is held in position by at least one lower plug connection and upper latch connections spaced apart from one another in the operating position of said screen on the roll bar, and wherein the central part can be released from the roll bar only after pivoting spring-loaded latch levers of the latch connections into a release position.

Primary advantages achieved by the invention consist in the fact that simple insertion and locking of the central part of the anti-buffet screen is provided by a lower plug connection and two upper latch connections. The spring-loaded latching levers of the releasable latch connections ensure that the central part can be removed only after the latching levers have been swiveled free manually. The lower plug connections secure the central part to the roll bar in a preliminary fashion. A subsequent forward pivoting motion automatically latches the central part to the clip brackets. This provides a high degree of security against improper use. The spring elements provided in the receptacles for the pins keep the mount from rattling. The clip bracket and the parts of the latch connection provided on the frame form a complete unit in terms of styling.

Other objects, advantages and novel features of the present invention will become apparent from the following detailed description of the invention when considered in conjunction with the accompanying drawings.

DETAILED DESCRIPTION OF THE DRAWINGS

Figure 1:
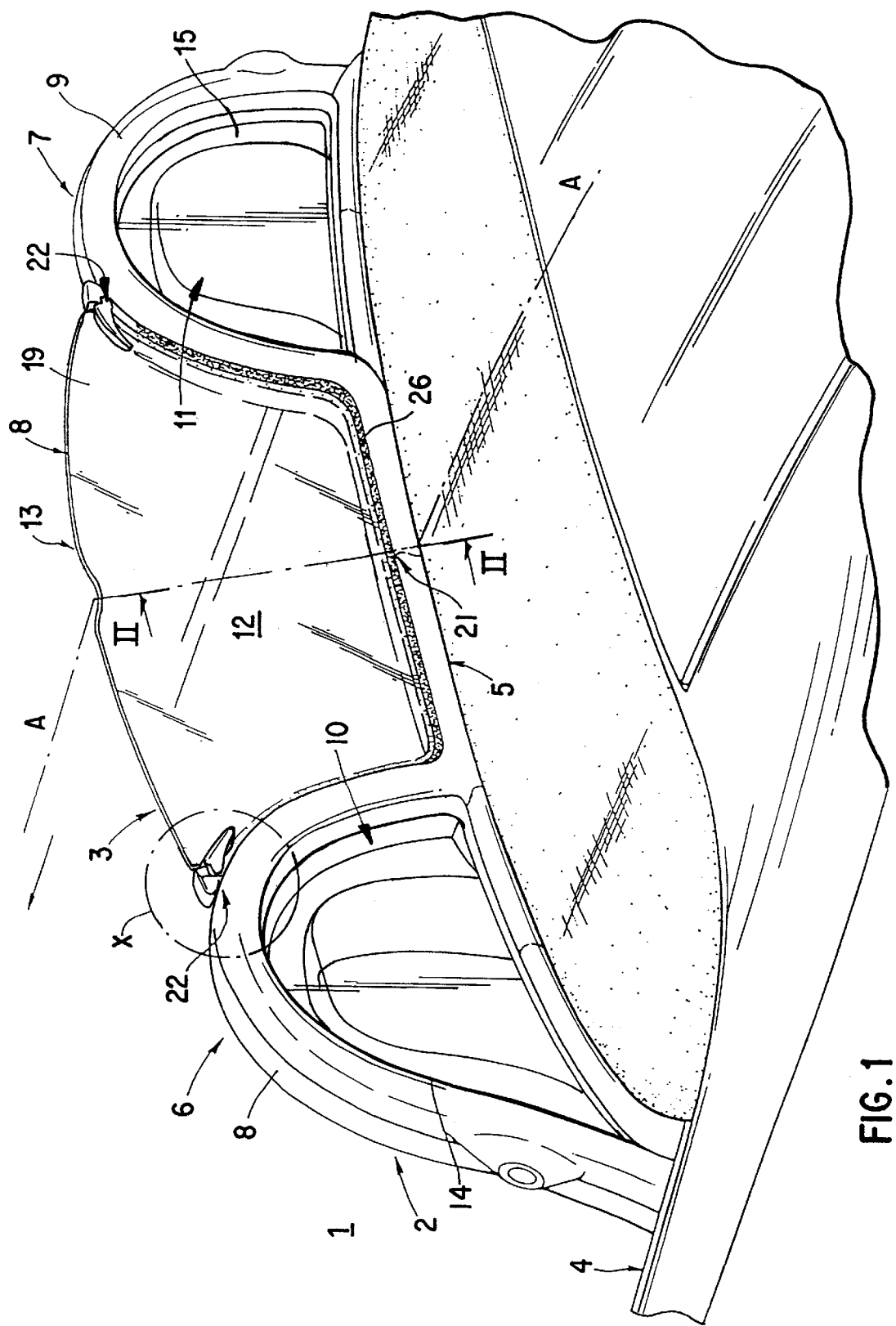
FIG. 1 is a perspective rear view of a fixed roll bar of an open motor vehicle (convertible) with a multipartite anti-buffet screen attached to the roll bar, constructed according to a preferred embodiment of the present invention.

An open two-seater motor vehicle (convertible) not shown in greater detail has a fixed roll bar 2 located behind the front seats 1, with an anti-buffet screen 3 mounted on roll bar 2 which protects the passengers seated in front seats 1 against a disturbing air flow entering from the rear (unpleasant drafts in the head and neck area).

Roll bar 2, fastened to the vehicle floor by upright support sections, has at least one tubular section 5 extending crosswise of the vehicle at approximately the level of vehicle belt line 4, said tubular section having a slightly curved shape in the embodiment shown. In outer lateral areas 6 and 7, two bar sections 8 and 9 projecting upward extend away from tubular section 5 that runs crosswise. Each bar section 8 and 9 together with a partial area of tubular section 5 that runs crosswise delimits an opening, 10 and 11. The area of bar sections 8 and 9 that faces the central lengthwise plane A—A of the vehicle and a central area of tubular section 5 define a section 12 of roll bar 2 that is open at the top.

Anti-buffet screen 3 extends in the vertical direction and is composed of a central part 13 and two side parts 14 and 15, with side parts 14 and 15 being inserted into openings 10 and 11 of bar sections 8 and 9 while central part 13 is inserted into section 12 of roll bar 2.

Central part 13 is formed by a transparent vertical pane 19 releasably connected with roll bar 2. For weight reasons, pane 19 is preferably made of a suitable plastic (Lucite™), with pane 19 possibly being given a scratchproof coating and/or tinting. Pane 19 can also be made of glass, however.

A grooved frame 26 is provided on the lower edge of pane 19 and/or on the two upright edges of pane 19 that are located externally and laterally, said frame being connected firmly with inserted pane 19 by gluing, clipping, or the like. Frame 26 in the embodiment shown is formed by a single plastic part. However, it can also.be made of aluminum, rubber, or the like.

Central part 13 of anti-buffet screen 3 is held in place in its operating position B on roll bar 2 by at least one lower plug connection 21 and two upper latching connections 22 spaced apart from one another, with central part 13 being releasable from roll bar 2 once again only after manually pivoting free the springloaded latching levers 27 of latch connections 22.

Lower plug connection 21, provided in the embodiment approximately in the vicinity of a lengthwise central plane A—A of the vehicle, comprises a bearing element 28 and a receptacle 29 (FIG. 2) cooperating therewith. Bearing element 28 is located on the crosswise tubular section 5 of roll bar 2, specifically on its upper side. According to FIG. 2, bearing element 28 has a bearing section 30 that is approximately semicircular and projects upward, said section extending in the crosswise direction of the vehicle and forming an active connection with the correspondingly designed receptacle 29, in the shape of a groove, of frame 26 when anti-buffet screen central part 13 is mounted. Bearing section 30 and receptacle 29 are designed so that a slight pivoting motion is possible during assembly of central part 13 (approximately 15°+/−5° for example).

Bearing element 28, made of plastic, has a partially coated riveted tab 31, with the uncoated part of riveted tab 31 that projects downward being fastened to an upright wall 32 of tubular section 5 (by rivets for example). Bearing element 28 however could also be associated with frame 26 while receptacle 29 could be associated with roll bar 2 (kinematic reversal).

Figure 2:
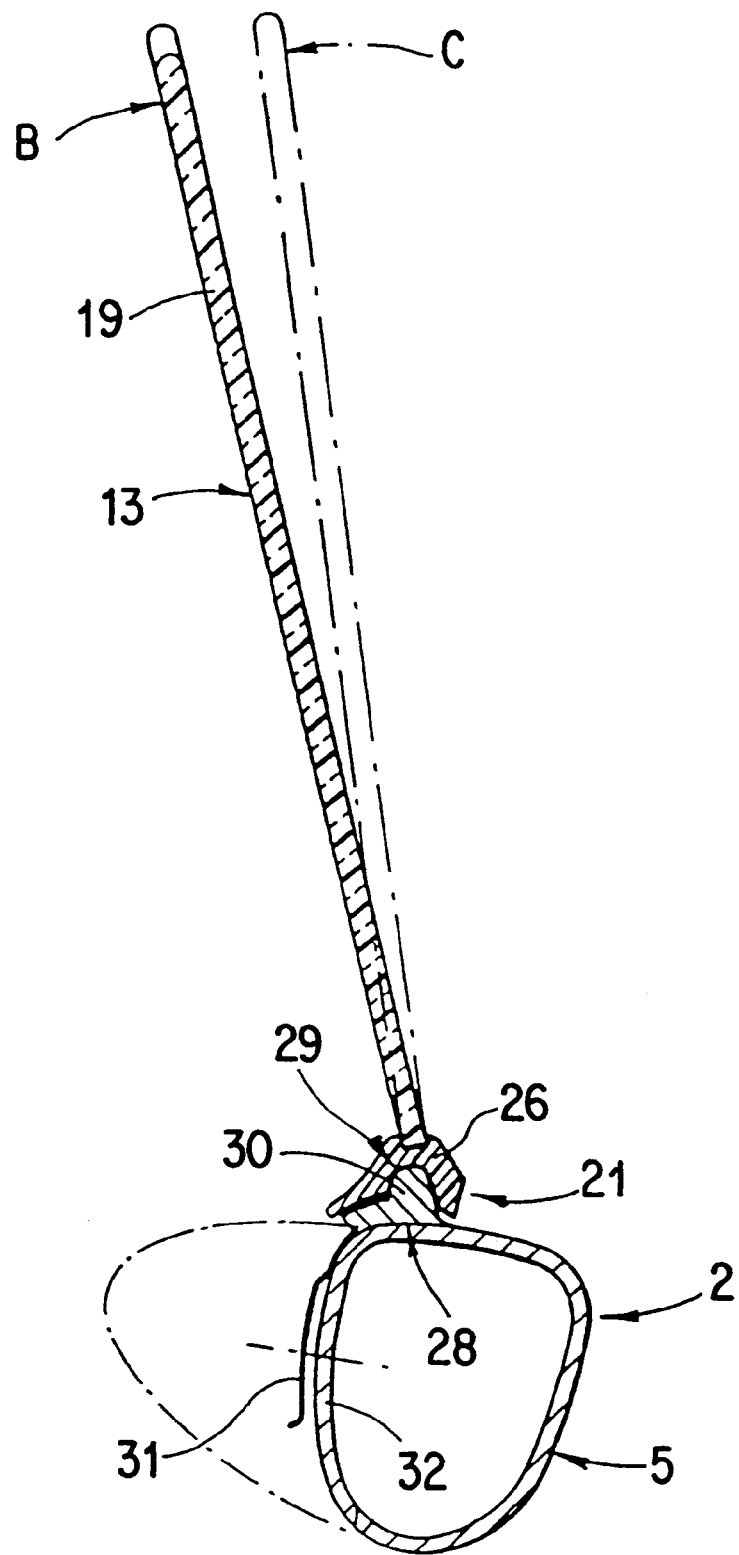
FIG. 2 is a section along line II—II in FIG. 1 through the lower plug connection between the central part of the anti-buffet screen and the roll bar.

Central part 13 in the embodiment shown is installed during assembly from above or diagonally from the rear, with receptacle 29 resting on projecting bearing section 30 (removal or installation position C). After lower plug connection 21 has been created (preliminary mounting), central part 13 is pivoted forward around lower bearing element 28 until central part 13 automatically latches to engage upper latch connections 22 (operating position B). In FIG. 2, operating position B is indicated by the solid lines and removal or installation position C by dot-dashed lines.

Each latch connection 22 comprises a clip bracket 33 that is fastened to the adjoining bar section 8 or 9 of roll bar 2, said clip bracket, when central part 13 is installed, cooperating with a molded pin 34 of frame 26 and a pivotable spring-loaded latch lever 27.

Figure 5:
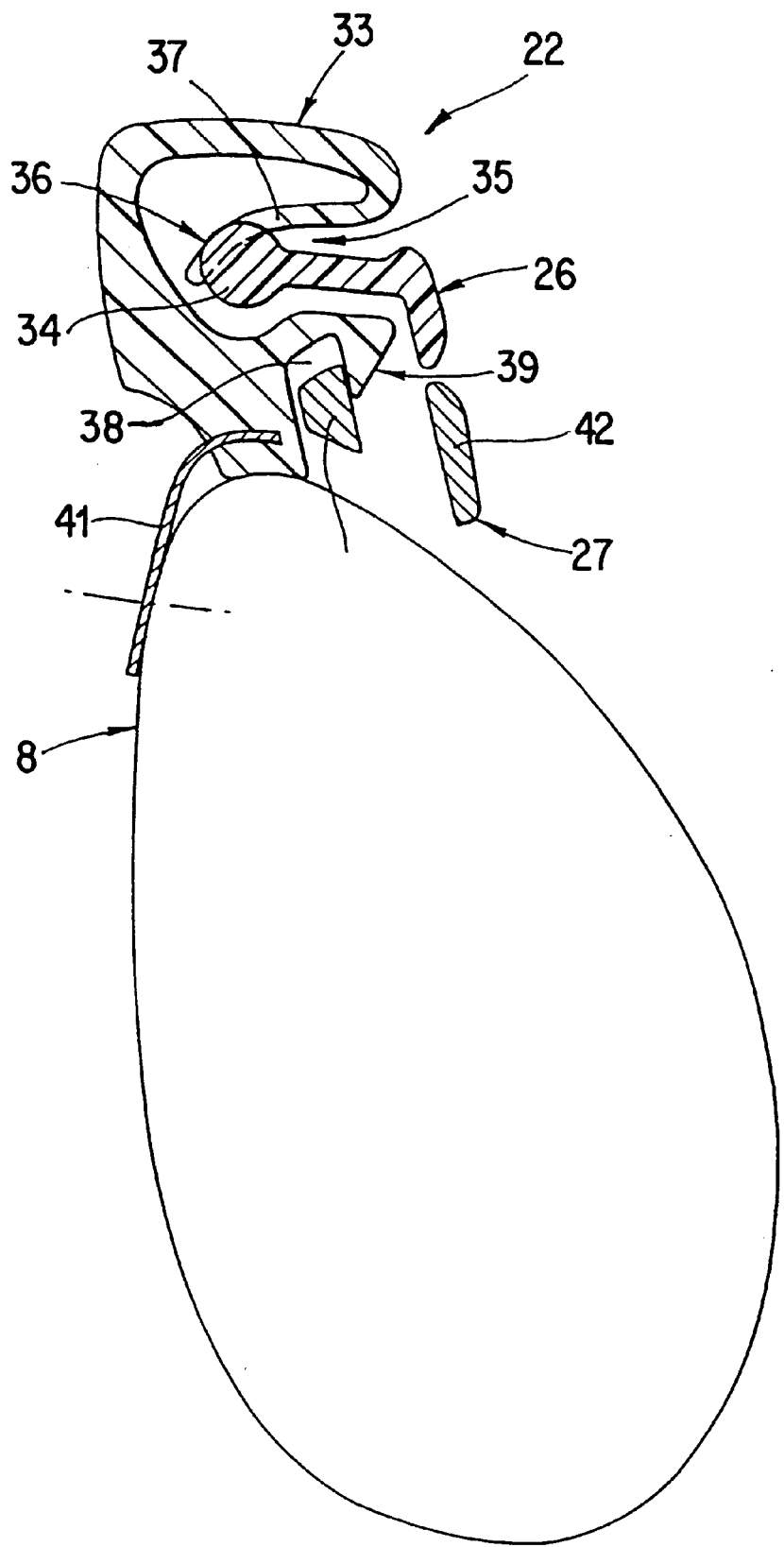
FIG. 5 is a section along line V—V of FIG. 3 on an enlarged scale.
Figure 6:
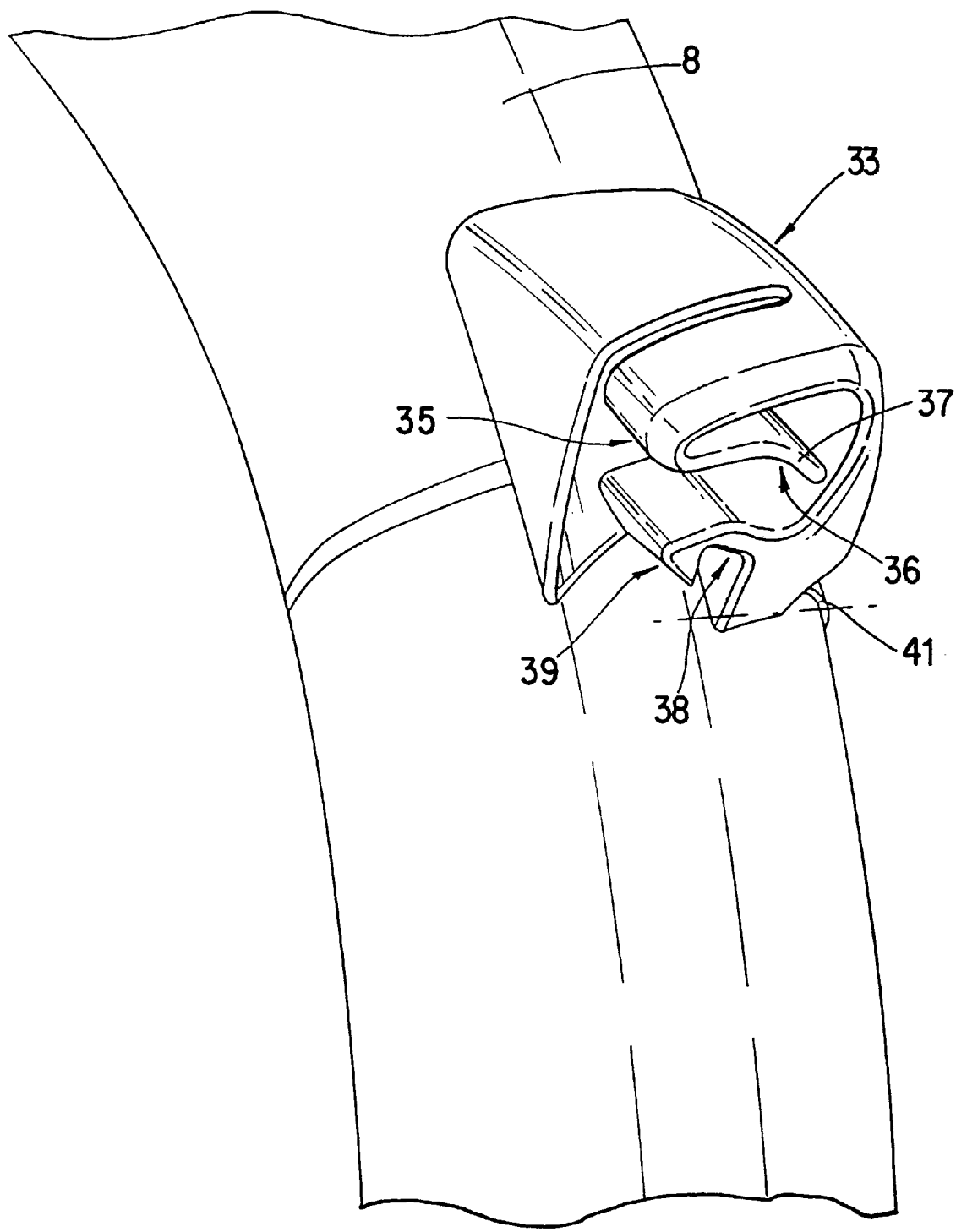
FIG. 6 is a perspective view of the clip bracket of the releasable latch connection, mounted on the roll bar.

Each pin 34, directed approximately horizontally and extending in the transverse direction of the vehicle, and made integral with frame 26 when central part 13 is mounted, projects into an upper receptacle 35 of clip bracket 33, said receptacle being open on one side, and forms an active connection therewith a spring element 36 (FIG. 5). As a result, rattling is prevented after central part 13 is inserted. The open side of receptacle 35 extends opposite to the direction of travel of the motor vehicle. Spring element 36 according to FIG. 5 is made integral with upper receptacle 35 of clip bracket 33 that is made of plastic, and is formed by a rib 37, said rib projecting inward and providing spring tension, said rib also abutting sections of pin 34 with pretensioning. Spring element 36 however could be formed by a separate part made of spring steel, subsequently clipped into receptacle 35 (not shown in greater detail).

Below upper receptacle 35, an undercut receiving groove 38 that extends vertically and has an insertion bevel 39 in front of it is provided on clip bracket 33, with spring-tensioned latch lever 27 sliding downward along insertion bevel 39 as central part 13 is pivoted forward, until it engages undercut receiving groove 38 that is open at the rear. During this process, forced lateral deflection of latch lever 27 takes place.

Spring-loaded latch lever 27 is mounted on frame 26 and is free to pivot around an axis of rotation 40, and can also be moved from a locking position D into a release position E and vice versa. This spring, not shown in greater detail, urges latch lever 27 in the direction of locking position D.

Since latch levers 27 are located on the side of anti-buffet screen 3 that faces away from front seats 1, latch connection 22 cannot be released from the seated position. To release latch connection 22, both latch levers 27 must be pivoted against the action of the springs, from locking position D into release position E in which they disengage from receiving grooves 38. Only then can central part 13 be pivoted from operating position B rearward into position C as shown in FIG. 2, when central part 13 can be removed. Clip bracket 33 and the parts of latch connection 22 form a continuous unit from the styling standpoint. According to FIG. 5, clip bracket 33 is fastened to roll bar 2 by means of a riveted tab 41 (by riveting for example).

Figure 3:
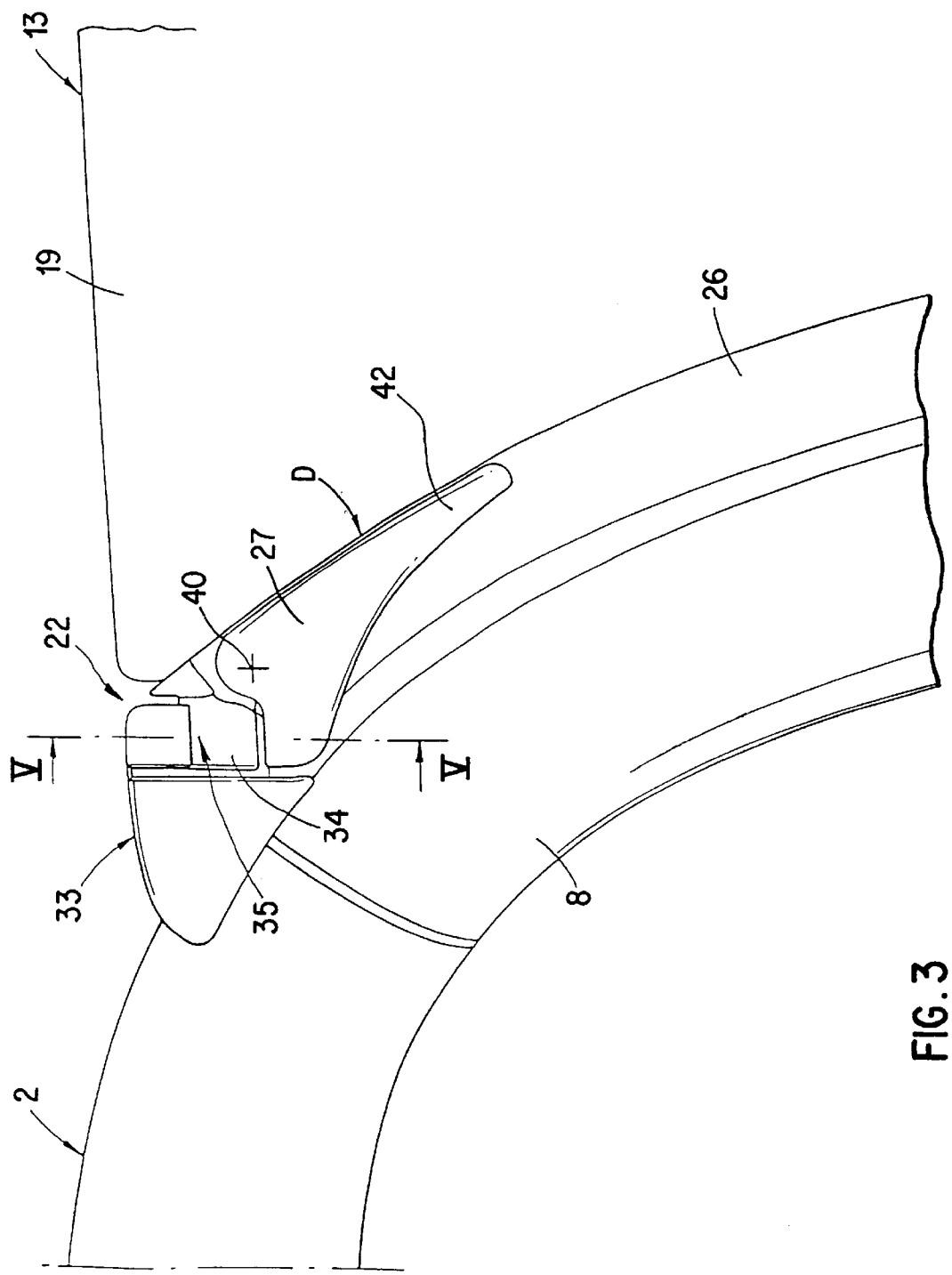
FIG. 3 shows a detail X of FIG. 1 in an enlarged view, said detail showing an upper latch connection between the central part of the anti-buffet screen and the roll bar, with a latch lever of the latch connection in a locking position.
Figure 4:
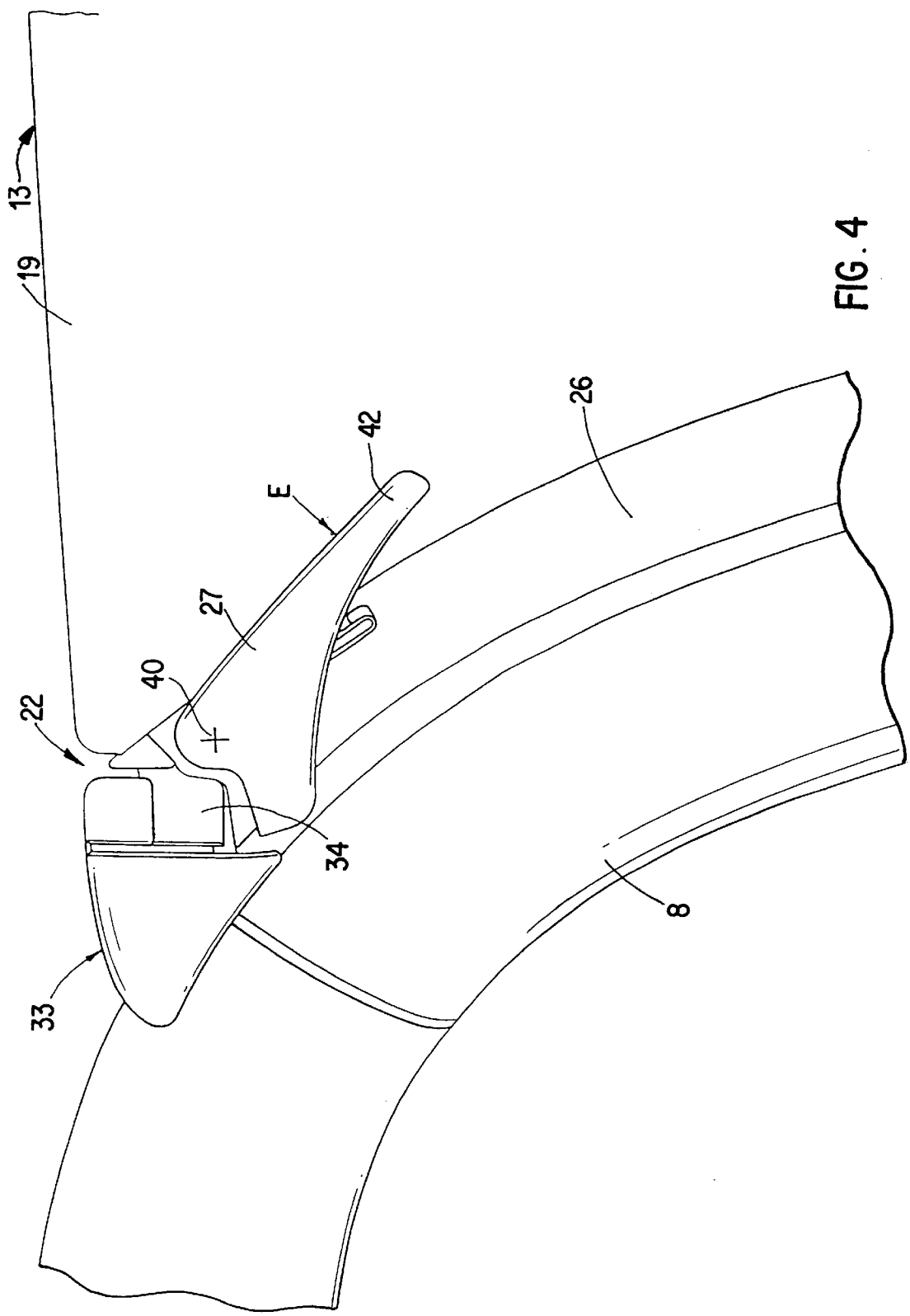
FIG. 4 is a view corresponding to FIG. 3 but in this case the latch lever is pivoted into a release position in which the latch connection can be released.

Latch lever 27, according to FIGS. 3 to 5, consists of a rear handle portion 42 and a latching tongue 43 in an active connection with receiving groove 38. Latching tongue 43 is made integral with handle section 42 and is aligned approximately parallel thereto.

The part of the latching tongue that cooperates with insertion bevel 39 when central part 13 is inserted has a curved shape.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Anti-buffet screen for a convertible having a belt line and a fixed roll bar, said screen being lockable in an upright operating position on the roll bar, with the roll bar comprising a tubular section that extends crosswise of the convertible and runs approximately at the level of the convertible belt line, from which tubular section upwardly projecting bar sections diverge in outer lateral areas, and wherein the anti-buffet screen is composed of a central part and two side parts, with the side parts being inserted into openings of the upwardly projecting bar sections and the central part being inserted into a central section of the roll bar that is delimited by the upwardly projecting bar sections and the tubular section running transversely, wherein the central part of the anti-buffet screen is formed by a transparent vertical pane and is held in position by at least one lower plug connection and upper latch connections spaced apart from one another in the upright operating position of said anti-buffet screen on the roll bar, and wherein the central part can be released from the roll bar only after pivoting said spring-loaded latch levers of the upper latch connections into a release position.

2. Anti-buffet screen according to claim 1, wherein the lower plug connection is formed by a bearing element and a receptacle cooperating therewith.

3. Anti-buffet screen according to claim 2, wherein the bearing element is located on the tubular section of the roll bar that runs transversely, and wherein the receptacle is formed on a frame of the pane.

4. Anti-buffet screen according to claim 2, wherein the bearing element has a bearing section that projects vertically upward and is approximately semicircular in shape, said bearing section being in an active connection with the receptacle when the anti-buffet screen central part is mounted, with the bearing section and receptacle being so designed that a limited pivoting motion of the central part is possible during installation.

5. Anti-buffet screen according to claim 3, wherein the bearing element has a bearing section that projects vertically upward and is approximately semicircular in shape, said bearing section being in an active connection with the receptacle when the anti-buffet screen central part is mounted, with the bearing section and receptacle being so designed that a limited pivoting motion of the central part is possible during installation.

6. Anti-buffet screen according to claim 1, wherein each upper latch connection comprises a clip bracket mounted on the adjoining bar section of the roll bar, said clip bracket cooperating with a molded pin and the spring-loaded latch lever when the central part is mounted.

7. Anti-buffet screen according to claim 6, wherein the pin projects into a receptacle, open on one side, of the clip bracket and is in an active connection there with a spring element.

8. Anti-buffet screen according to claim 7, wherein the spring element is made integral with the receptacle of the clip bracket, which is made of plastic, and is formed by a bent tensioning rib.

9. Anti-buffet screen according to claim 6, wherein the spring-loaded latch lever is pivotably mounted on a frame of the pane and engages an undercut receiving groove of the clip bracket when the central part is mounted.

10. Anti-buffet screen according to claim 9, wherein the undercut receiving groove is vertical, said clip bracket having an insertion bevel located in front of the undercut receiving groove, along which the spring loaded latch lever slides until the spring-loaded latch lever engages the receiving groove when the central part is mounted.

11. Anti-buffet screen according to claim 1, wherein each upper connection includes a clip bracket having an insertion bevel, and wherein the central part is preattached to the roll bar after the lower plug connection is formed, and wherein forced latching of the central part in the two upper latch connections is performed with a subsequent forwardly directed pivoting motion of the central part, with the spring-loaded latch levers being pivoted into said release position as they slide along the insertion bevel of the upper latch connection during forced latching.

12. A convertible automobile assembly comprising:

a fixed roll bar including a pair of upwardly projecting sections located behind respective vehicle seats and a substantially horizontal lower center section connecting the upwardly projecting sections together, and an anti-buffet screen which is selectively manually movable between a first position and a second position, wherein said second position is an operative position substantially filling a space above the lower center section and between the upwardly projecting sections of the roll bar, said anti-buffet screen being formed by a transparent pane which in said operative position is connected to the roll bar by a connection arrangement including:

(i) a lower plug connection at said center section of the roll bar, and (ii) upper latch connections at each of said upwardly projecting sections of the roll bar, said upper latch connections including spring loaded latch levers which permit manual removal of the anti-buffet screen only upon movement of the spring-loaded latch levers against a spring force of the spring-loaded latch levers to a release position.

13. An assembly according to claim 12, wherein said antibuffet screen and connection arrangement are configured to accommodate manual placement of the anti-buffet screen into the lower plug connection followed by pivoting movement of the screen about said lower plug connection to force the spring-loaded latch levers into a latching position.

* * * * *